United States Patent
Essinger et al.

(10) Patent No.: US 6,224,808 B1
(45) Date of Patent: *May 1, 2001

(54) DESTRUCTIBLE CORE FOR USE, IN PARTICULAR, IN THE ASSEMBLING OF A TIRE

(75) Inventors: Olivier Essinger, Villars-sur-Glane; Daniel Laurent, Marly, both of (CH)

(73) Assignee: Conception et Developpement Michelin S.A. (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/903,388

(22) Filed: Jul. 30, 1997

(30) Foreign Application Priority Data

Aug. 1, 1996 (FR) .................................... 96 09856

(51) Int. Cl.⁷ .............................. B29C 33/40; B29C 33/50
(52) U.S. Cl. .......................... 264/221; 264/313; 264/317; 264/326; 264/501; 264/DIG. 44; 264/331.13; 249/61
(58) Field of Search ........................... 264/221, DIG. 44, 264/317, 313, 326, 501, 331.13; 249/61

(56) References Cited

U.S. PATENT DOCUMENTS

| 2,517,902 | * | 8/1950 | Luebkeman | 264/221 |
| 4,126,659 | * | 11/1978 | Blad | 264/90 |
| 4,177,027 | * | 12/1979 | Grawey et al. | 425/49 |
| 4,387,070 | * | 6/1983 | Cunard et al. | 264/247 |
| 4,588,542 | * | 5/1986 | Pierce | 264/45.5 |
| 4,699,578 | * | 10/1987 | Sumner et al. | 424/33 |
| 5,262,121 | * | 11/1993 | Goodno | 264/571 |
| 5,535,799 |   | 7/1996 | Sergel et al. . | |
| 5,551,763 | * | 9/1996 | Alsman | 301/64.7 |

FOREIGN PATENT DOCUMENTS

| 4916779 | 1/1980 | (AT) . |
| 1934465 | 1/1971 | (DE) . |
| 3206171 | 8/1983 | (DE) . |
| 0685321 | 12/1995 | (EP) . |
| 0695780 | 2/1996 | (EP) . |
| 0715947 | 6/1996 | (EP) . |
| 1456231 | 1/1967 | (FR) . |
| 2640188 | 6/1990 | (FR) . |
| 1261916 | 1/1972 | (GB) . |
| 2284173 | 5/1995 | (GB) . |

* cited by examiner

Primary Examiner—Leo B. Tentoni
Assistant Examiner—Suzanne E. McDowell
(74) Attorney, Agent, or Firm—Baker Botts LLP

(57) ABSTRACT

A toroidal core is produced on a rim 1 comprising a central portion connecting two annular lateral anchoring zones. The rim has an air passage orifice which can be selectively closed or opened and connected to a source of pressure, to the atmosphere or to vacuum. A conduit 3 passes through the rim and has a valve 30 which can be selectively closed or opened, the conduit extending to an orifice to which a pipeline can be connected by a suitable flange 13. A stretchable membrane 2 is mounted on the radially outer side of the rim and is fastened to it in air-tight manner on anchoring zones over the entire periphery of said rim so as to define a closed space on the radially outer side of said rim between the rim and the membrane. A fluid 6 fills said closed space to overflowing, said membrane being pressed against a mold 5. After filling, the membrane is pressed against the mass of filling material under the effect of the vacuum maintained in said closed space, thus producing a substantially rigid core supported by the rim 1.

15 Claims, 9 Drawing Sheets

DESTRUCTIBLE CORE FOR USE, IN PARTICULAR, IN THE ASSEMBLING OF A TIRE

BACKGROUND OF THE INVENTION

The present invention relates to a destructible core for the manufacture of hollow objects of various shapes, in particular hollow parts which could not be removed from a one-piece metallic mold. In particular, the invention proposes a core of approximately toroidal shape, defining the inner cavity of a tire, for the manufacture of a tire having a shape identical or very close to the shape established by the vulcanization.

Such cores have already been proposed in the prior art, in particular in the field of tires. Mention may be made of rigid cores of metal which are divided into several parts so that they can be extracted from the inside of the tire after the tire has been vulcanized. Mention may also be made of U.S. patent application Ser. No. 08/785,422 which describes a device comprising a reinforced rubber membrane which can serve as a rigid core during the assembling of a rubber tire from its basic components and which can be withdrawn from the tire by folding said reinforced membrane.

All of these devices provide solutions which are technically satisfactory. However, their manufacture is rather lengthy and expensive. The object of the present invention is to propose means for providing a substantially rigid core, which lends itself well to the manufacture of tires, but which may have broader applications.

SUMMARY OF THE INVENTION

The invention relates to a method of manufacturing an object comprising, during each manufacturing cycle, the steps of:

creating a cavity of predetermined volume and shape by means, on the one hand, of a new contribution of material forming a membrane which is placed on the molding surface of a first mold, said molding surface having an opening, and by means, on the other hand, of a support which closes said opening and is in contact with said membrane over the entire periphery of the opening, in order to define a closed space within said support and said membrane, filling the entire volume of said cavity to overflow with a fluidizable solid material;

making said fluidizable material rigid and opening the mold in order to release a rigid core which is integral with said support containing said fluidizable material which has been made rigid, while maintaining the said core by the support, and of using said core to manufacture an object, the core defining a so-called inner surface of said object;

making said fluidizable material fluid and extracting it in order to destroy the core and to recover said material for the manufacture of a following object.

By way of example of a fluidizable material, mention may be made of a pulverulent material which is made rigid by creating a vacuum in said space in order to apply the membrane against said material and which is made fluid by eliminating the vacuum.

In the carrying out of the method proposed, said membrane is applied against said material under the effect of a vacuum created in said closed space, which makes said fluidizable material rigid, and said material is extracted after having broken said vacuum, which makes said material fluid again. The principle used consists in imprisoning, in a very thin and stretchable membrane, a filling material having for instance the form of a fine sand and then forming a vacuum in order to obtain a rigid form. This means that the form should be sufficiently coherent, sufficiently firm to act as a manufacturing support as explained hereunder. Balls of small diameter, of for instance between 0.1 and 0.5 mm, constitute a suitable filling material. For example, hollow or solid glass balls of a diameter of about 0.2 mm may be used. Such a material may very easily be made sufficiently fluid to facilitate the flow thereof, for instance by judiciously selecting and/or conditioning the fluid in which said material is bathed.

A suitable membrane is formed, for instance, of a plastic film. One type of film which is suitable is, for instance, a sheet of Nylon of a thickness of 50 micrometers. Of course, the precise selection of the material constituting the membrane depends on the application intended. The membrane is said to be stretchable because it can adapt itself to the shape which it is desired to impart to the core. The stretching which it undergoes may be result in permanent deformation. In order to place the membrane on the molding surface of the first mold, one can proceed in the following manner: unwind a sheet of stretchable material constituting said membrane, cover the surface of said support and fasten said membrane over the entire periphery thereof, which defines a closed space between support and membrane, close said first mold around the assembly consisting of support and membrane in order to create said cavity of predetermined volume and shape and, from the side of said support on which the membrane has been mounted, apply the membrane against the wall of said first mold. The membrane can be stretched until it is brought in contact with the first mold after the closing of the first mold and after filling said volume by subjecting said closed space to an increase in pressure. The stretching can be facilitated, for instance, by an increase in temperature.

In the case of the application to rubber tires, the film selected must be compatible with use at the temperature of vulcanization of the tire. Further, the rubber constituting the inner skin of the tire must be able to adhere sufficiently on the core while it is deposited, in accordance with the method of depositing selected. As example of such a method, mention may be made, for instance, of the winding of ribbons of raw rubber in suitable manner on and around the core.

One advantage of the invention is that it is possible to obtain a core within a very short time after the designer of the object to be manufactured has defined the shape thereof. In the case of tires, it is very easy to produce the first mold on a lathe. In the more particular case of tires in which the ratio of the height of the sidewall divided by the diameter at the seat is rather great, the invention makes it possible to produce a core which can very easily be used for such tires since the destruction of the core does not raise any particular problem, in contrast to the difficulty of removing from the mold a rigid core formed of several heavy parts by passing the heavy parts through the small space available within the tire.

Another advantage of the invention is to propose the means for creating a core on which a pneumatic tire or a non-inflated or non-pneumatic elastic solid tire can be built in its final shape. As to the support, after the steps of the method of manufacture which have been mentioned above, the object and the membrane can either be separated from said support in order to use said support again in a subsequent manufacturing cycle of an object (the support forms part of a machine) or else the support constitutes, after the manufacture of the object, an integral part thereof and, in this case, the support is renewed upon each manufacture of said object. For example, it is made on the same installation. In this case, there is produced a pneumatic tire fastened permanently on its rim, or else a solid tire attached permanently to its rim or to any member (serving as support in the present invention) which permits mechanical attachment to a wheel or to a rotary member, while being able to obtain a closed pneumatic cavity upon the manufacture of the pneumatic or solid tire.

In its application to a pneumatic tire, the support is, for instance, a rim on the radially outer side of which said membrane is mounted. The edges of the membrane are fastened over the entire periphery of said rim in two annular lateral anchoring zones so as to define said closed space on the radially outer side of said rim, between the rim and the membrane. The core obtained is toroidal. It is used as inner core around which a pneumatic tire is manufactured and molded. The molding of the so-called outer surface of said tire is obtained by means of a second mold. When the molding of the tire has been completed, the said second mold is opened and withdrawn.

The invention also proposes an installation for the manufacture of a core the exact shape of which is dictated by the application contemplated. Such an installation comprises:

- a reservoir capable of containing a fluidizable solid material;
- means for handling a first mold the molding surface of which defines, at least in part, the outer surface of said core, said molding surface being open;
- means for maintaining a support;
- means for manufacturing an air-tight membrane which is placed on said molding surface of the first mold and creating a cavity, of predetermined volume and shape, by closing said opening by means of said support, so as to define a closed space between the support and the membrane;
- means for transferring said material from the reservoir to said closed space and conversely so that said material can occupy the entire volume of said cavity;
- means for making said material rigid so as to create a core integral with the support.

In order to form an air-tight membrane the invention proposes an embodiment in which there is used a stretchable film distributor which, during each cycle, permits a further contribution of membrane-forming material. The installation comprises, for instance, means for unwinding the film and for building and fastening the film in air-tight manner on the periphery of said support so as to provide said membrane and create an assembly comprising the support and the membrane, said closed space being defined between support and membrane, and in which the means for handling a first mold bring this first mold into contact with said support, thus creating a cavity of predetermined volume and shape on the side of said support where said membrane is located.

The solid material in question is said to be "fluidizable" since it is advisable that it can flow in order to be transferred. The fluidizing can involve any treatment depending on the nature of said material, for instance a heat treatment (alloys of low melting point). In order to favor the flow of said material, the transfer means comprise means for varying the pressure prevailing in said closed space as compared with the pressure prevailing in said reservoir. Thus a pressurizing of the reservoir, combined with the placing of the closed space in communication with the atmosphere or the placing of it under vacuum, favors the flow of glass balls which are bathed in the air. Of course, air can be replaced by other types of fluid provided that they constitute a suitable means for making the filling material employed sufficiently fluid.

One thus obtains a core serving as base for the manufacture of any object, said core comprising:

- a support comprising an orifice for placing under pressure and/or in communication with the atmosphere and/or placing under vacuum, which opening can be selectively closed or opened, said support furthermore comprising a conduit passing through it having a valve which can be selectively closed or opened, the conduit leading to an orifice to which a pipeline can be removably connected,
- a stretchable membrane mounted on the periphery of said support, fastened in air-tight manner to the periphery of said support so as to create an assembly comprising the support and the membrane, said assembly defining a closed space between support and membrane,
- a fluidizable material filling said closed space to overflow, said membrane being applied against said material under the effect of a vacuum maintained in said closed space.

The following description illustrates the invention as applied to the manufacture of a rubber pneumatic tire without this in any way limiting its scope. In this case, said core is a substantially toroidal core used for the manufacture of a pneumatic tire and in which said support is a rim comprising a middle portion, for instance a substantially cylindrical portion, connecting two annular lateral anchoring zones. The edges of the rim constitute annular lateral anchoring zones. The rim thus resembles what is generally known as a single-piece rim by analogy with the terminology used for the wheels of vehicles. However, one can also, for example for reasons of convenience of installation of the membrane, have recourse to a two-piece rim the edges of which have anchoring zones which are movable axially with respect to each other.

DESCRIPTION OF THE DRAWINGS

The invention will be better understood from the following description of examples, given by way of illustration and not of limitation, with reference to the accompanying drawings, in which.

DESCRIPTION OF PREFERRED EMBODIMENTS

Figure 1:
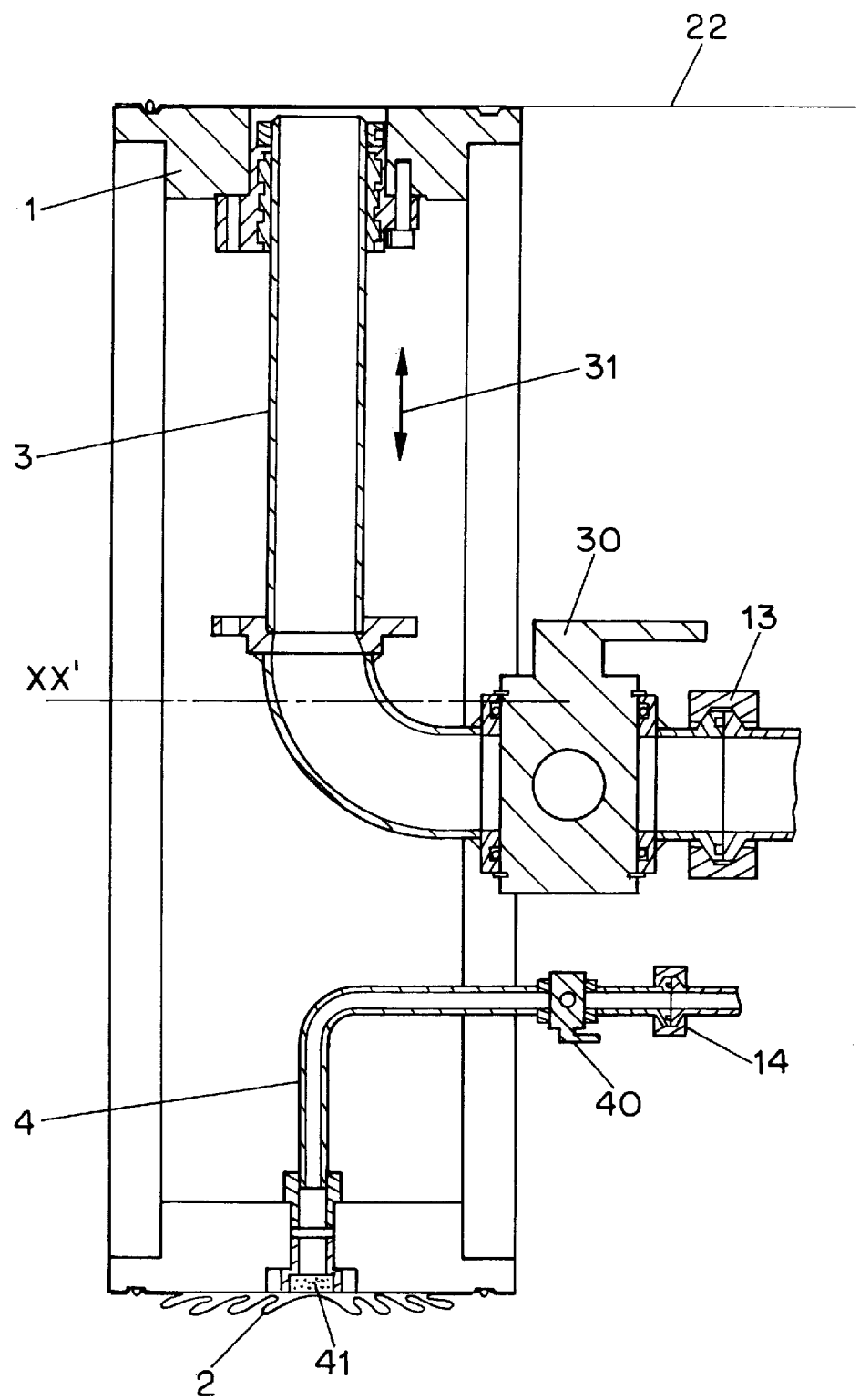
FIG. 1 shows the start of the construction of the core, at two different stages, in a half view from above and a half view from below.

FIG. 1 shows a rim 1 and a stretchable membrane 2. The width of the film 22 used (see FIG. 3) to form said membrane, as shown in the upper part of FIG. 1, is contained between the width of the rim and the developed length of a cord applied against the rim to be built, maintained in a radial plane, plus a surplus length which permits or facilitates the fastening on the rim 1. Stated differently, the maximum value of said width corresponds to the meridian perimeter of the membrane 2, as seen in a section through the core in FIG. 5.

The rim 1 comprises a radially retractable conduit 3 equipped with a valve 30 communicating with an orifice to which a connector can be connected by a collar 13. Through this conduit the glass balls can then be introduced or removed. The conduit may therefore be connected to the rim (that is to say more generally to the support) and slides with respect to it, as indicated diagrammatically by the arrow 31 in such a manner that its end 32 can be flush with the radially outer surface of the rim 1 or protrude a predetermined height from said surface. By "flush" there is understood an arrangement in which said conduit is retracted so that it does not protrude beyond the surface of the rim in order not to interfere with the installation of the membrane. Of course, this also covers an arrangement in which the conduit could even be recessed with respect to the surface of the rim. The rim 1 also comprises at least one stationary conduit 4, equipped with a valve 40 and an air-vent filter 41 which permits the passage of air (or the fluid in which said material is bathed) in both directions but prevents flow of the glass balls or more generally stops the flow of the fluidizable material selected. This conduit 4 leads to an orifice to which a connector can be connected by a collar 14. In this embodiment, the conduit 4 serves for placing under vacuum, for placing under compressed air, or for connecting to the atmosphere. More generally, it makes it possible to subject the closed space to any level of pressure or vacuum desired. Such a rim, comprising a withdrawable conduit, is of interest, whatever the type of membrane used, even for a membrane installed permanently on the side anchoring zones.

A first mold 5 (FIG. 2), formed of two shells 51 and 52, represents the negative of the core to be manufactured. Its inner surface corresponds substantially to the surface of the inner cavity of the pneumatic tire which it is desired to assemble. The mold 5 is equipped with at least one vent 50. This first mold is thus formed by two bodies of revolution having a connecting line located in a plane perpendicular to the axis of the tire, said plane being such that said connecting line corresponds to the largest perimeter that such a plane can contain. It is used here in an installation in which the said means for handling the mold assure relative axial movement between each of the two parts and between each part and the rim.

Figure 3:
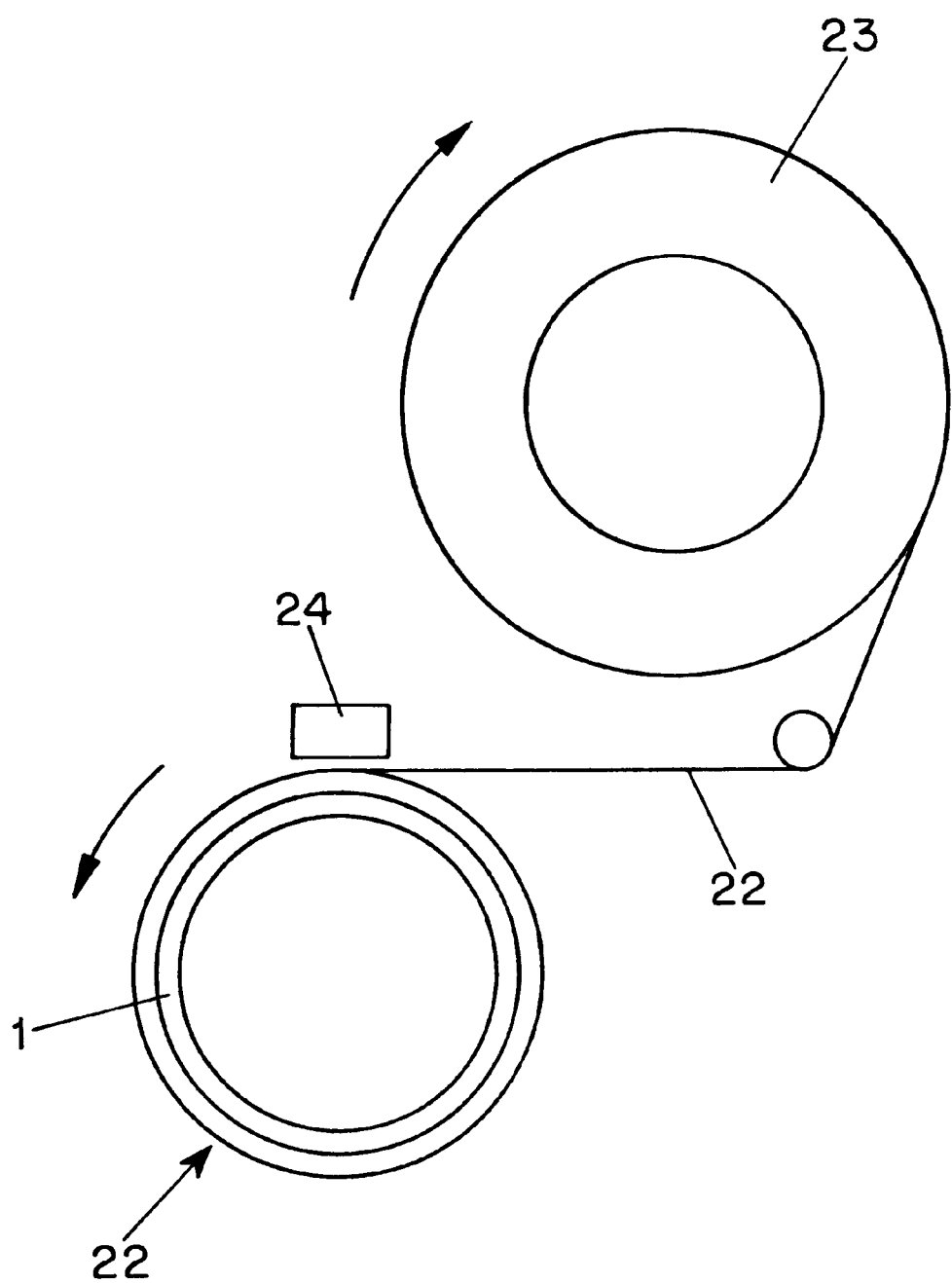
FIGS. 3 and 4 diagrammatically show the installation used for manufacturing such a core.
Figure 4:
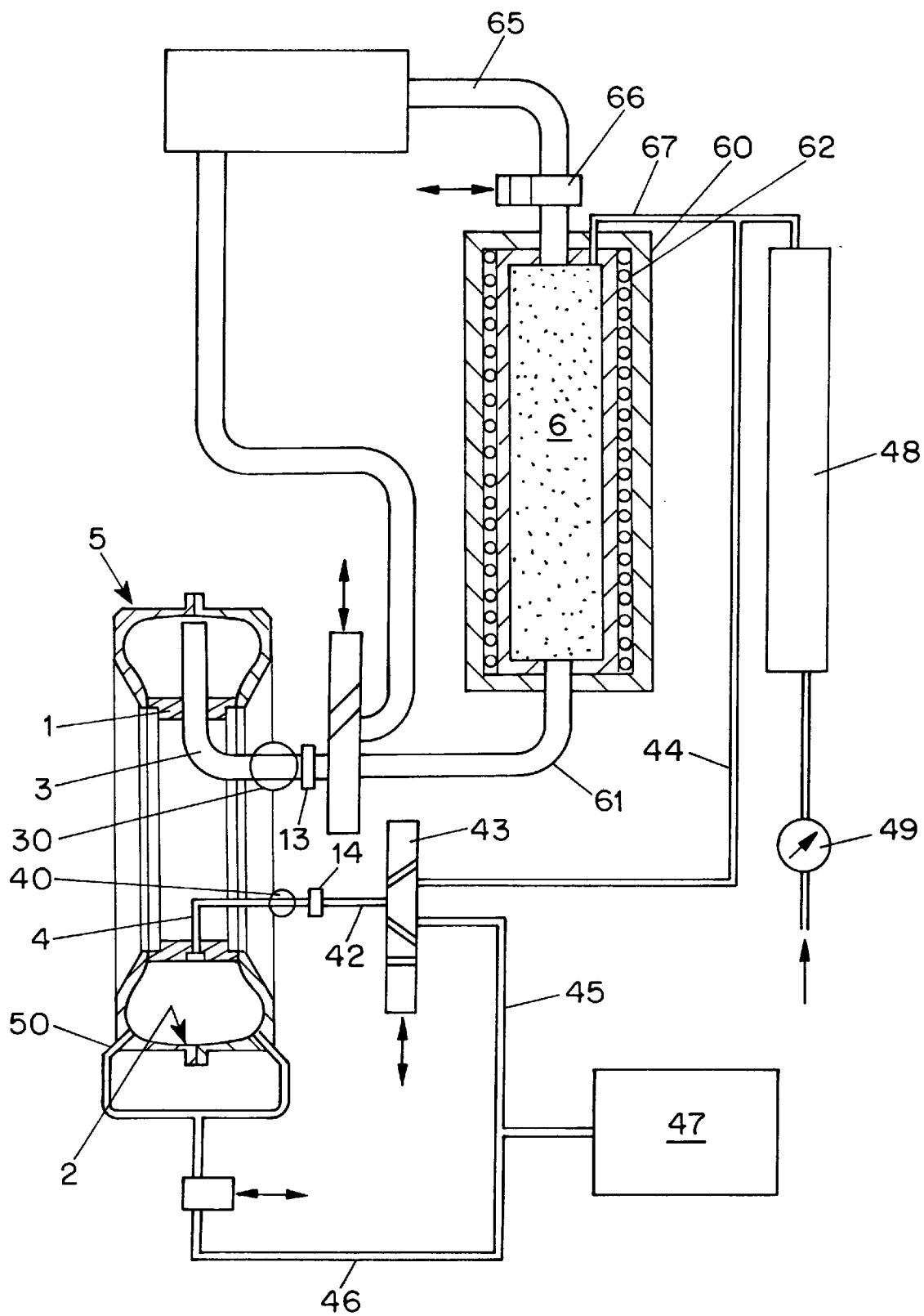

FIGS. 3 and 4, in particular, give a general view of the peripherals used to cause the glass balls 6 to circulate. One can note first of all in FIG. 3 the means which make it possible to construct a stretchable membrane, namely a film distributor comprising a reel 23 of film 22, as well as device 24 for the cutting and welding of this film. In the part of the installation illustrated in FIG. 4 an air network (compressed air and/or vacuum) and a circulation system for the glass balls 6 can be noted. The glass balls are contained in a reservoir 60. The reservoir is controlled in temperature by a suitable fluid flowing in a peripheral network 62. A pipe 61 extends from the bottom of the reservoir 60 to join the space to be filled via a three-way valve 33. In order to facilitate the flow of the balls, said reservoir 60 is preferably located higher than the lowest point of the feed conduit towards the inside of the cavity to be filled. A circuit for the recovery of the glass balls 6 is connected in parallel to the pipe 61. This circuit comprises a pipe 63, an aspirator 64, and a pipe 65 bringing the glass balls to the top of the reservoir 60. There can again be noted a cut-off valve 66 located on said pipe 65.

Let us return now to the air network. A pipe conducts the compressed air coming, for instance, from a shop network via a pressure regulator 49. There can be noted an air heater 48 which delivers the air to the reservoir 60 via a pipe 67. The compressed air is thus conducted to a four-way selection valve 43 via a pipe 44. The selection valve 43 makes it possible either to place the closed space contained between the rim 1 and the membrane 2 in communication with the source of compressed air or vacuum or with the atmosphere, or keep it isolated. There can again be noted a pipe 42 connecting said selection valve 43 to the valve 40, and therefore to the closed space. The selection valve 43 is also connected to a vacuum pump 47 via a pipe 45. The vent or vents 50 are also connected to the same vacuum pump 47 by a pipe 46 and a cut-off valve 54.

The installation operates in the following manner. First of all, a membrane is produced. For this purpose, in this example a suitable length of film is taken and wound around the rim 1. After having wound at least one turn of film on the rim 1, a welding and cutting device 24 is actuated and effects a sufficiently air-tight welding together of the ends of the length of film removed. There is thus formed a sleeve 20 which surrounds the rim (FIG. 1). One of the lateral edges of the sleeve 20 is fastened on first edge of the rim 1, for instance by a first band 21 made from an iron wire welded end to end or side to side or the ends of which are twisted. The sleeve 20 is then folded in axial direction in order to be able to fasten the other edge of the sleeve 20 on the other edge of the rim 1. The fastening of the membrane 2 on the rim 1 must be sufficiently air-tight to permit the placing of the closed space defined by the sleeve 20 and the rim 1 under a sufficient vacuum. At least the level of the vacuum must be sufficient so that the core thus constructed must remain sufficiently firm. The exact time is a function of the application contemplated. Of course, one can also maintain a vacuum pump in operation during all or part of the time of use of the core in order to continuously compensate for any possible leakage flow through the membrane or its attachments on the rim.

Figure 2:
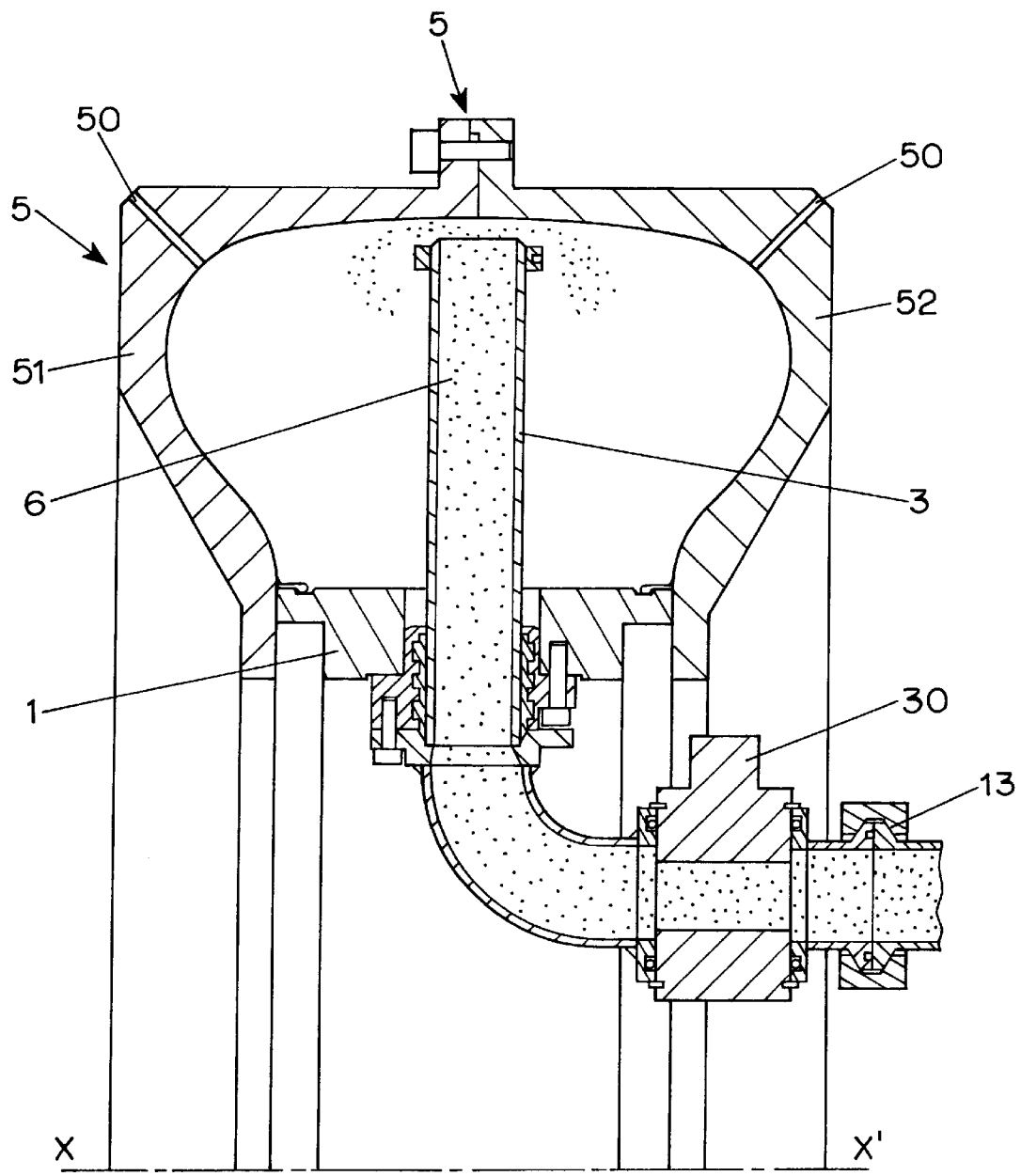
FIG. 2 illustrates the filling of the core by the filling material.

The shells 51 and 52 are then brought into contact with the rim 1 so as to define a space which will be filled by glass balls. The membrane 2 is first of all unfolded within the cavity. Under the combined effects of a pressurizing of the space contained between the rim 1 and the membrane 2 via the conduit 40 and a venting of the space contained between the membrane 2 and the mold 5 by the vent or vents 50, the membrane 2 is stretched and is applied against the wall of the mold 5. The venting can possibly be facilitated by the placing the vents 50 under vacuum. The conduit 3 is then moved until its top 32 is close to the wall of the mold 5, as shown in FIG. 2.

Since it is convenient for the filling of the cavity to take place, at least in part, under the action of gravity, it is important, from this stage, that the assembly be arranged with the axis XX' horizontal and the end 32 of the conduit 3 extend upwardly. The filling material can thus overflow over the top 32 and drop back into the entire volume of the cavity to be filled without being disturbed by the material already present in said cavity. For this purpose, the said means for maintaining the rim make it possible to position it with the axis horizontal, the rim being immobilized so that its angular position leads and maintains the conduit either upward for the reason indicated above or downward for the extraction of the balls, as will be explained further below. By actuation of the proper valves, the reservoir 60 is placed under pressure and the space to be filled with glass balls is placed in communication with the atmosphere. During this time, the surface of the mold 5 is maintained under vacuum (via the vent or vents 50) so that the membrane 2 remains applied against the mold 5. The glass balls 6 flow from the reservoir into the cavity which they fill completely. Depending on the filling material used and/or depending on the prior conditioning of said material, it may be useful to have the assembly consisting of the mold 5 and the rim 1 vibrate during the filling.

Figure 5:
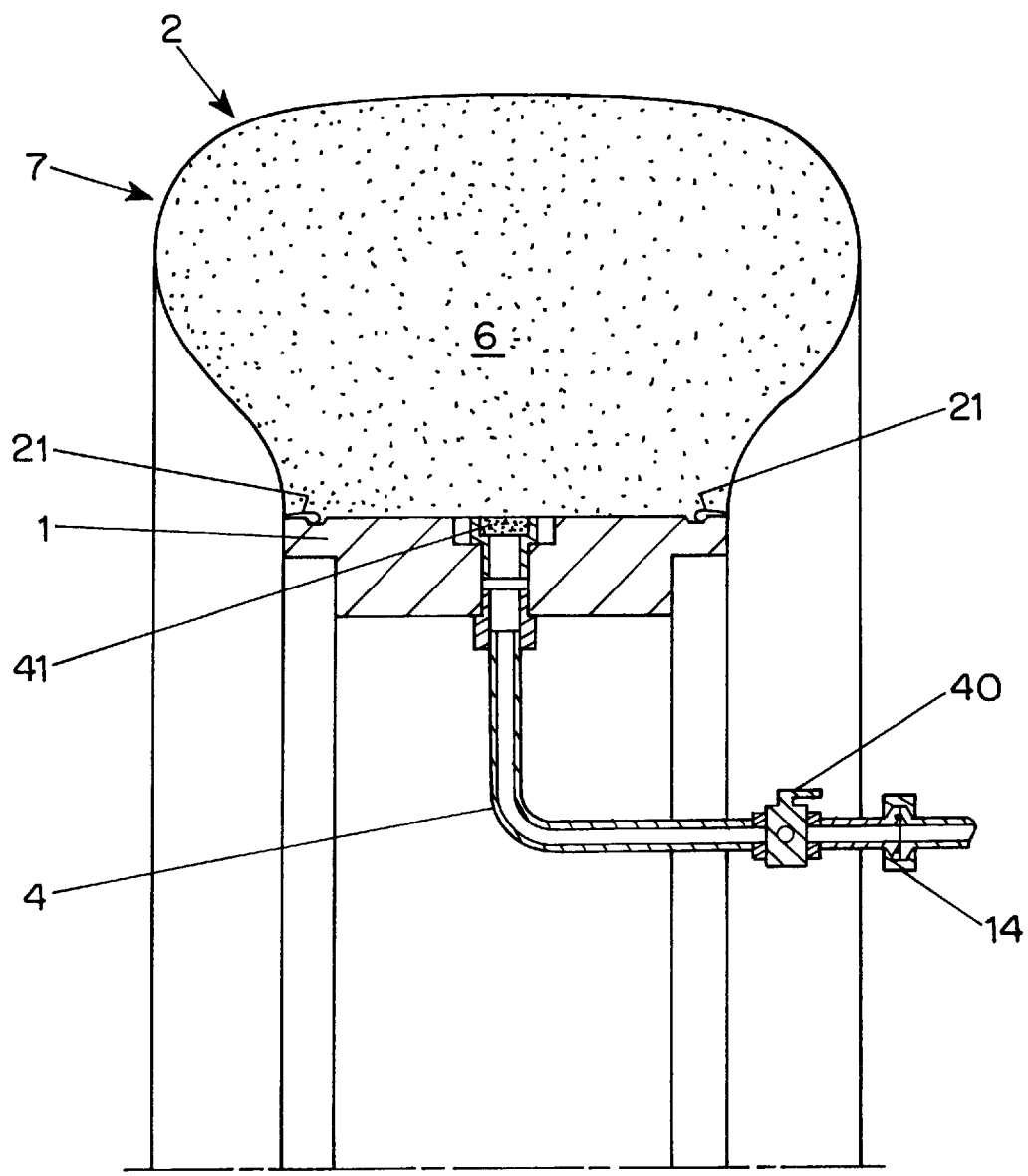
FIGS. 5 to 7 are views of the core at different subsequent stages, showing the construction of the core, its use in the manufacture of a pneumatic tire and then its dismantlement.

The filling being completed, the said closed space containing the glass balls 6 is isolated or placed under vacuum by actuating the selection valve 43 while placing the vents in communication with the atmosphere. The membrane 2 is drawn against the glass balls 6 and thus forms with the balls 6 a firm mass in order to produce a substantially rigid core. The assembly consisting of mold 5 and rim 1 of the installation can then be isolated and disconnected while maintaining the vacuum in the closed space containing the glass balls 6. The mold 5 is opened, which releases the core 7 produced on the rim 1 (FIG. 5).

Figure 8:
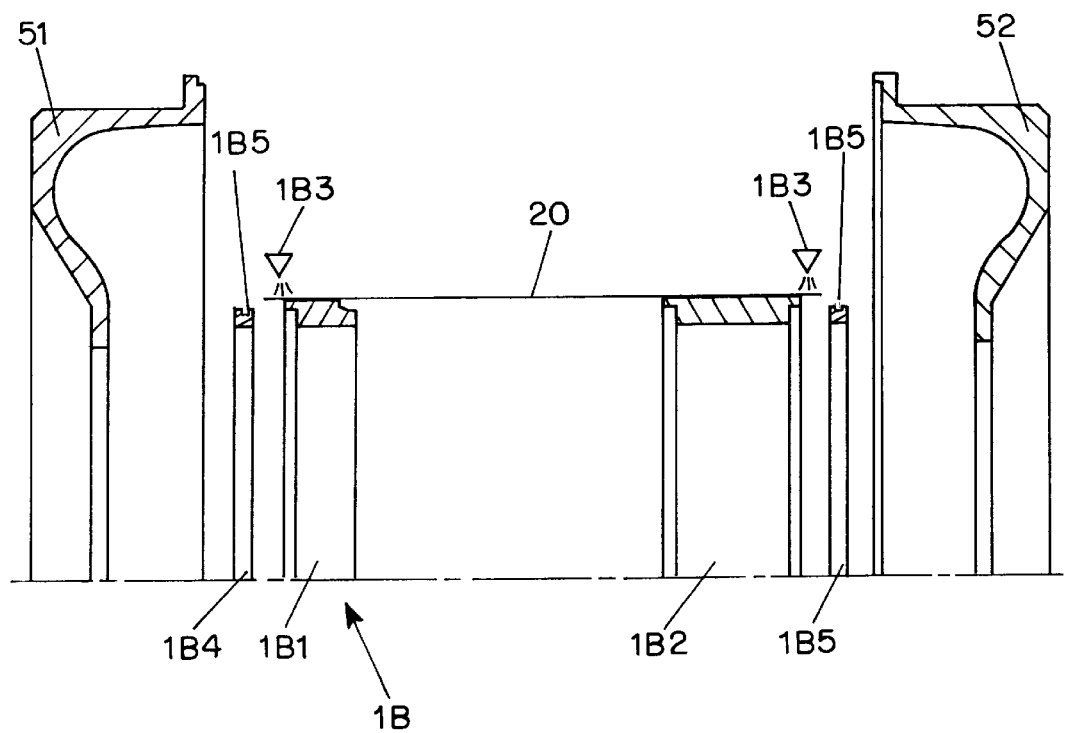
FIGS. 8 and 9 show the use of a two-part rim for the manufacture of a core.

In FIG. 8 there has been shown a variant embodiment of the core in which the support is provided by a rim 1B formed of two half-rims 1B1 and 1B2 which are axially separable. The annular lateral anchoring zones are arranged on each of the half-rims and are formed of recesses provided on the axially outer and radially inner edge of said rim, cooperating with rings 1B4 and 1B5 in order to clamp the edges of said membrane. The tightness between half-rims and rings can be favored by toroidal joints such as those 1BS mounted on the rings. At the start, the half-rims 1B1 and 1B2 are spaced from each other. A sleeve 20 which surrounds the half-rims 1B1 and 1B2 in a manner similar to that which has been explained above is formed. The fastening to the rim is, however, different. By means of nozzles 1B3 which blow compressed air over the entire periphery, the edges of the sleeve 20 are bent over on both sides of the half-rims 1B1 and 1B2. The rings 1B4 and 1B5 can then be brought into contact with the half-rims 1B1 and 1B2. It is then necessary to be able to move the half-rims 1B1 and 1B2 together without pinching the film constituting the sleeve 20. The installation is designed in such a manner that the sleeve 20 moves apart from the half-rims 1B1 and 1B2 during the movement towards each other of the half-rims 1B1 and 1B2 to which the edges of the sleeve are henceforth fixed (under the effect of a certain internal pressure), or else the installation comprises nozzles which make it possible to blow on the sleeve from the inside during the axial bringing together.

Figure 9:
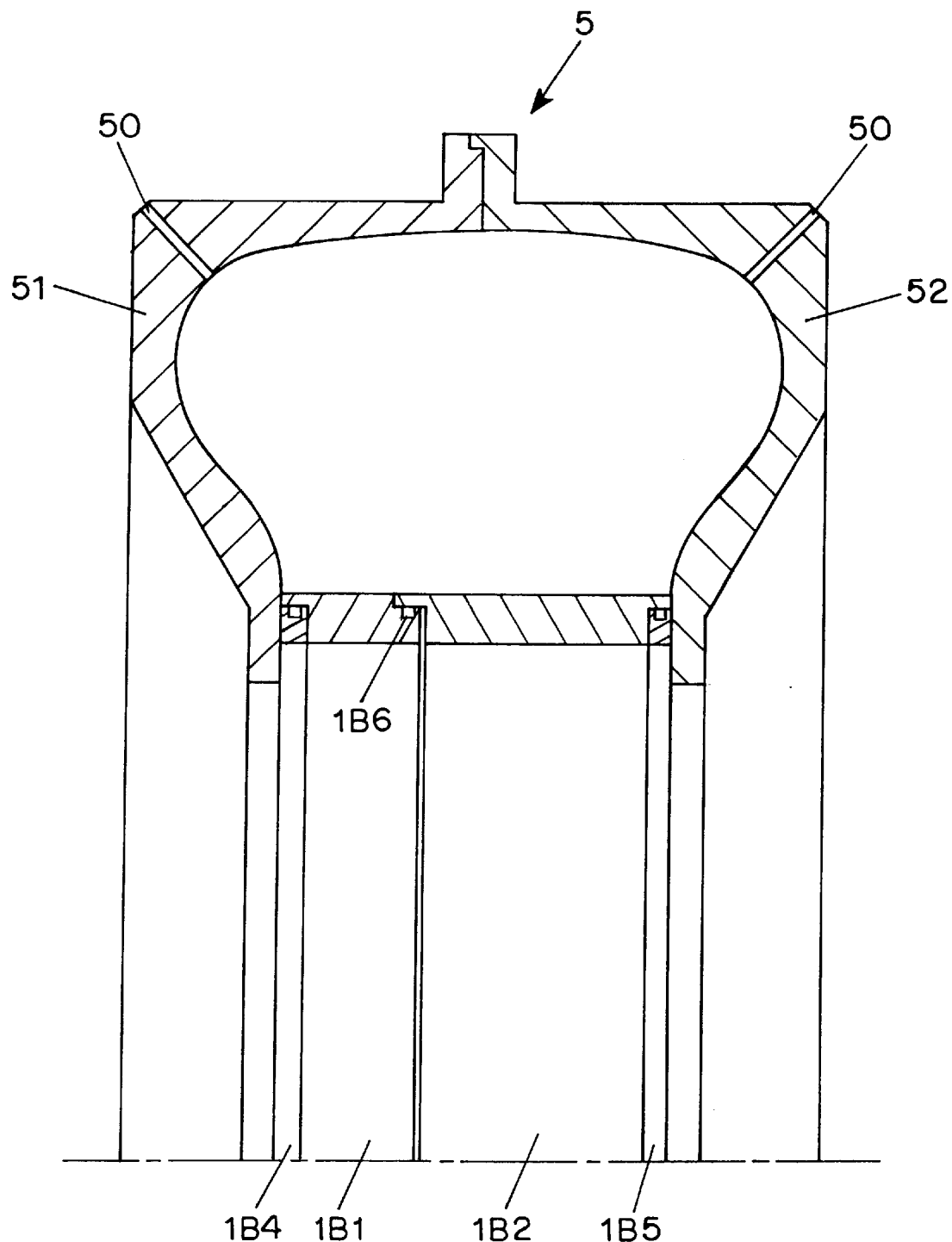

One then finds oneself with a configuration similar to the first embodiment. The shells 51 and 52 are in contact with the rim 1B (FIG. 9) in order to define a closed space which is to be filled with glass balls. A joint 1B6 assures the tightness between the half-rims 1B1 and 1B2. All the other aspects are the same as in the first variant, in particular the existence of conduits 3 and 4, which have not been shown in order not to overload the drawings needlessly.

As the example described concerns the manufacture of a rubber pneumatic tire, one therefore proceeds at this stage with the assembling of the raw tire by providing all the component parts on and around said core in accordance with various suitable methods, which do not in themselves form an object of the present invention. One thus obtains a raw tire 8 covering the core 7, as shown in FIG. 6.

Figure 6:
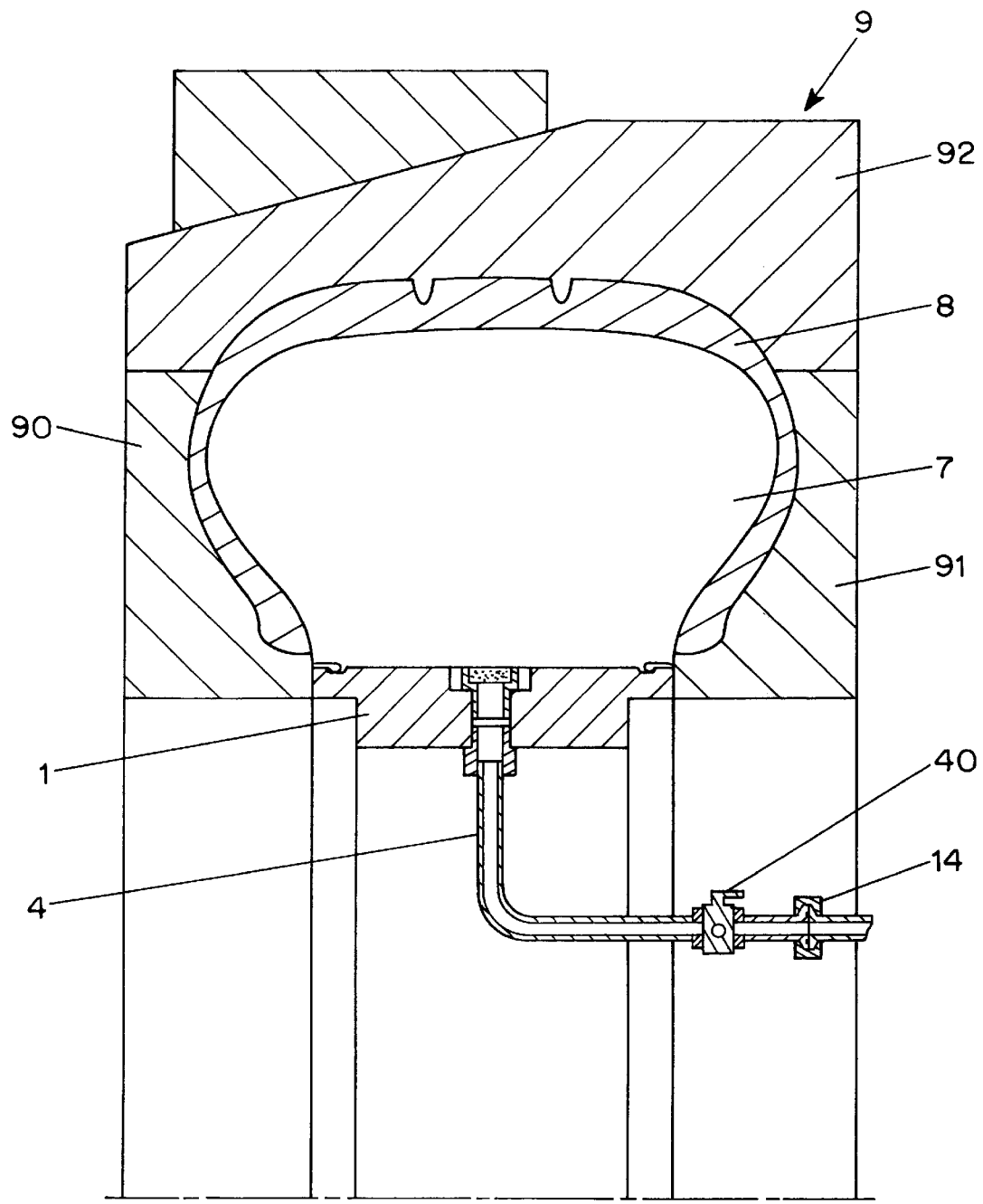

The assembling of the tire 8 being completed, there can be closed around it an outer mold 9 formed for instance in traditional manner of elements 90 and 91 molding the sidewalls and of elements 92 molding the tread (FIG. 6). The vulcanizing of the tire can take place. We point out that the vulcanization can be carried out with imposed volume if the core as such is used as in the vulcanization step, and/or with imposed pressure if the vacuum prevailing in the inner closed space is suppressed during the vulcanization stage and said closed space subjected to a suitably controlled pressure. In this latter case, after the closing of the second mold and before the opening of the second mold, the vacuum prevailing in said closed space being interrupted, the internal vulcanization pressure is transmitted by a fluid acting from the inside of the closed space.

Figure 7:
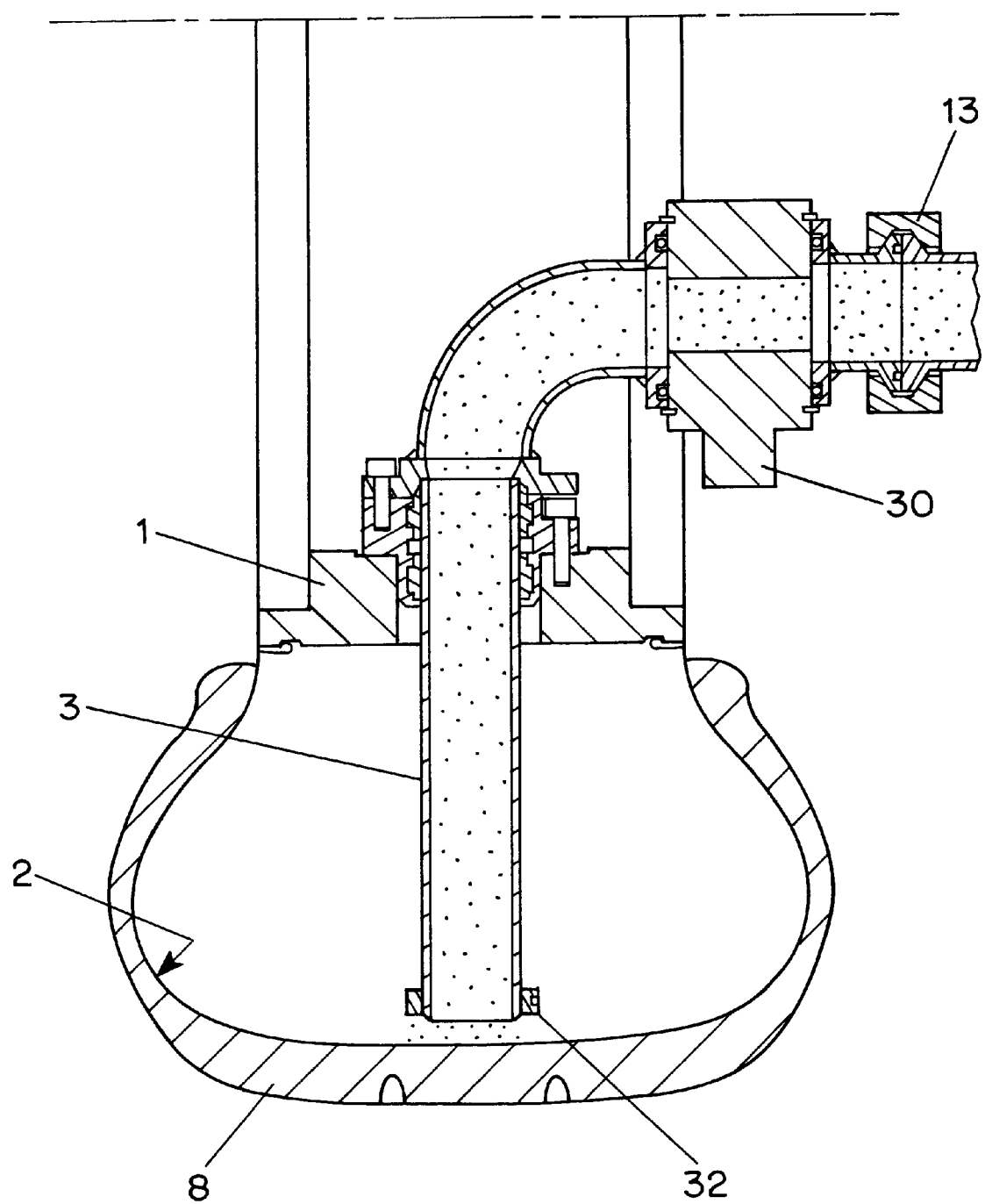

The phase of the destruction of the core 7 will now be described, which can take place during the vulcanization and therefore before the opening of the second mold, or else after the vulcanization and therefore after the opening of the second mold. The core 7 which supports the tire is again connected to the installation shown in FIG. 4 by collars 13 and 14 connected to the conduits 3 and 4. The glass balls 6 are drawn in through the conduit 3 due to the aspirator 64 which returns them to the reservoir 60. For this, at least during the suction phase, the axis XX' is preferably horizontal and the end 32 of the conduit extends downwardly (FIG. 7). The valve 40 is open and the selection valve 43 places the closed space in communication with the atmosphere or with the source of compressed air.

The conduit 3 is then retracted radially. The tire 8 can be separated from the rim 1, which can be done by cutting the membrane close to its attachment to the rim, or by withdrawing the rings 1B4 and 1B5 in the second variant. At this stage, the membrane can be removed from the inside of the tire or else left as packing and protection of the tire until it is delivered, or else said membrane can be left in final manner within the tire, thus contributing to the protection of its inner wall in case of travel with the tire flat, and/or contributing to the air-tightness of the inner skin of the tire, or providing other properties useful at this place of the tire. The following manufacturing cycle starts by the forming of a new membrane.

In the example illustrating the invention, as the filling material consists of glass balls its thermal conductivity is very slight. The filling by glass balls 6 leaves a large amount of empty space within the core 7. The core is thus by nature a very poor conductor of heat. In particular, if the vulcanization is carried while leaving the tire on the core 7, it may be desired that the core 7 be at a rather high temperature in order that it does not absorb too great a part of the heat contributed by the mold 9 upon the vulcanization, and at the same time sufficiently low not to cause too rapid a vulcanization of the rubber placed on the core during the assembling of the tire. It is known, in fact, that it is desirable to avoid vulcanizing before the rubber is subjected to a certain pressure level. Moreover, as the increase in temperature of the rubber mixes close to the core or in contact with it may be very slow, depending on the specific heat capacity of the material used, one can preferably adapt the formulation of said mixes so as not to increase the total time of vulcanization of the tire. For this purpose, a very rapid vulcanization system can be used, such as that described in patent application EP 0 695 780.

In practice, in accordance with the present embodiment the glass balls 6 are preheated and maintained at a temperature of about 100 to 120° C. in the reservoir 60. The core 7 is therefore produced at the same temperature. Of course, since the vulcanizing of the tire increases its temperature to a far higher temperature, the skin of the core 7 will also tend towards a temperature close to the vulcanization temperature, the latter being compatible with a reasonable time for curing the tire. However, in view of the insulating nature of the core, the temperature gradient from the surface of the core is very high so that the heating effect on the mass of glass balls 6 contained in the core 7 remains low. Therefore, and this constitutes an advantage as compared with the use of metal cores, it is not necessary to wait for the cooling of the core after a vulcanization before again using the same balls for the assembling of the following tire.

It has been seen that the invention also makes it possible to destroy the core at the very start of the vulcanization or else at any time before the end of the vulcanization (and therefore of the manufacture of the object), for example as soon as the outer mold 9 is closed around the tire. In this case, the aspirating of the glass balls can also take place while the position of the core 7 is such that its axis is vertical. The aspiration, despite everything, is possible by creating a sufficiently strong radial stream of air to entrain all these balls out of the closed space. For example, air-inlet slits are provided over the entire periphery of the rim near its edge located axially on top and slits for evacuation of the air entraining the balls over the entire periphery of the rim near its edge located axially at the bottom.

When the destruction of the core takes place at the very start of the vulcanization or else at any time before the end of the vulcanization, a regulated pressure is applied to the tire during the vulcanization via the membrane 2. Furthermore, heat can be imparted to the tire from the inside also, by controlling the temperature of the fluid on the inside of the membrane 2, if necessary by circulating it. Preferably nitrogen or suitably dehydrated air is used. One can also structure a process in which a vulcanization law is followed so that the essential part of the vulcanization energy is contributed from the outside. The invention thus makes it possible to benefit from the advantage that there is in constructing and then molding a raw tire on a substantially rigid core, while providing the possibility of vulcanization under controlled conditions of temperature and pressure to which the inner wall of the tire is subjected, with, in the case of the stretchable membrane described here, the advantage of a negligible heat barrier as compared with the conventional vulcanization membranes.

The invention also extends to a method of manufacturing a pneumatic or solid tire of vulcanizable rubber comprising a phase of assembling a raw blank, a molding phase, and a vulcanization phase, in which:

the assembling of the blank is effected on a rigid core formed essentially of a fluidizable solid material enclosed in a closed space comprising a membrane which defines the surface on which the raw blank is assembled, said material being made rigid;

the molding is effected by closing around the core supporting the blank a mold comprising other rigid parts cooperating with the core in order to define the final geometry of the tire and to define a molding volume corresponding substantially to the volume of the raw blank, so as to imprison the blank and mold all the faces thereof;

the vulcanization is then carried out under regulated pressure and, after molding of the blank, making said material fluid again and subjecting said closed space to the action of said regulated pressure.

In one embodiment, the contribution of the heat necessary for the vulcanization reaction is effected by thermal transfer through the said other rigid parts of the mold.

As a variant, as already mentioned, the principle of manufacture of a core explained above can be used to manufacture an assembly in which a tire in permanently connected to its rim. In this case, the rim 1 is no longer an element of the tire manufacturing machine but a part which has been produced previously. Of course, in this case the conduits 3 and 4 are designed to be connected removably to the passageways provided for this purpose on the rim. The tire is permanently connected to the edges of the rim. The person skilled in the art can imagine numerous possibilities and there are furthermore various known solutions in the prior art. Mention may be made, for instance, of the U.S. Pat. No. 5,535,799 or of the patent application DE 32 06 171. Of course, in this case, the membrane 2 remains permanently in the pneumatic tire or elastic solid tire without any drawback for the latter. Likewise, whether for the last variant mentioned or for the first, the fact that a few glass balls may possibly remain in the tire is not prejudicial for its operation.

We claim:

1. A method of manufacturing a pneumatic tire of vulcanizable rubber comprising a phase of assembling a raw blank, a molding phase, and a vulcanizing phase, the method comprising:

assembling a raw blank on a rigid core formed essentially by a fluidizable solid pulverulent material enclosed in a closed space defined by a membrane having an outer surface on which the raw blank is assembled, said fluidizable pulverulent material being made rigid by creating a vacuum in said closed space;

molding the tire by closing around the core supporting the blank a mold having a mold surface, the mold comprising other rigid parts which cooperate with the core in order to define the final geometry of the tire and to define a molding volume which corresponds substantially to the volume of the raw blank so as to imprison the blank and the mold surface for molding the tire and vulcanizing the molded tire with regulated pressure by, after molding the blank, again making said fluidizable pulverulent material fluid by eliminating the vacuum and subjecting said closed space to the action of said regulated pressure.

2. A method according to claim 1, in which the heat necessary for the vulcanization reaction is supplied essentially by thermal transfer through said other rigid parts of the mold.

3. A method according to claim 1, in which the pulverulent material consists of balls of small diameter of thermally insulating material.

4. A method according to claim 1, comprising, after the closing of the second mold, and before it is opened, relaxing the vacuum prevailing in the said closed space and transmitting a vulcanization pressure by a fluid acting on the inside of the closed space.

5. A method according to claim 4, in which the destruction of the core commences before the removing of the second mold.

6. A method according to claim 1, in which the vacuum created in the closed space is eliminated during the vulcanization stage, so that the vulcanization stage is carried out in part with imposed volume and in part with imposed pressure.

7. A method of manufacturing an object comprising, upon each manufacturing cycle of a new object, the steps of:

providing a first mold having an internal molding surface of predetermined shape and having a chamber defined by said molding surface and limited by an outer periphery;

providing a support, the surface of which further defines the chamber;

creating a new non-reusable membrane by covering the internal molding surface of said first mold with a desired quantity of material forming the new non-reusable membrane and by fixing the membrane to the surface of the support over the entire periphery of the chamber in order to define a closed cavity between the surface of the support and the membrane;

filling to overflow the entire volume of the cavity with a fluidizable solid material;

making the fluidizable material rigid and opening the mold in order to release a rigid core integral with the surface of said support by means of the membrane retained in fixed contact with the surface of the support and containing said fluidizable material which has been made rigid, the core being thereby supported by the support;

using the core to manufacture an object, the core defining an inner surface of the object;

making the fluidizable material fluid and extracting it in order to destroy the core, to recover said fluidizable material for the manufacture of another object and to release the object and the non-reusable membrane.

8. A method according to claim 7, comprising, in order to deposit the membrane on the molding surface of the first mold, the steps of:

supplying a new sheet of stretchable material constituting the said membrane, covering the surface of said support and fixing said membrane on the surface of said support to define a closed space between the surface of the support and the membrane;

closing said first mold around the membrane on the surface of said support in order to create said cavity of predetermined volume and shape on the surface of said support on which the membrane has been affixed;

expanding the membrane against the molding surface of said first mold.

9. A method according to claim 8, comprising, after the closing of the first mold and before filling said volume, subjecting the said closed space to an increase in pressure in order to stretch the membrane so as to bring it in contact with the first mold.

10. A method according to claim 7, comprising, during each manufacturing cycle, separating the said membrane from said support in order to release said object and said membrane, and using the said support again with a new membrane for the manufacture of another object.

11. A method of manufacturing a tire using the method according to claim 7, in which the support is a rim and the membrane is a membrane-forming sheet fastened on the entire periphery of said rim on two annular lateral anchoring zones so as to define said closed space between the outer periphery of the rim and the membrane, and so as to form a core of revolution, integral with said rim, which is used as an inner core around which a tire is produced and comprising:

molding said tire on said inner core, the outer surface of the tire being molded by means of a second mold;

at the end of the molding of the tire, opening and withdrawing said second mold.

12. A method according to claim 11, comprising arranging the components of the tire on said core after its release from the first mold so as to prepare a raw tire, whereupon said second mold is closed around the raw tire, covering said core in order to complete the molding and vulcanizing of the tire.

13. A method of making a destructible rigid core around a rim for use in molding an article of manufacture comprising the steps of wrapping a new non-reusable membrane around an outer surface of the rim, clamping axially opposite edges of the membrane on the outer surface of the rim, leaving a portion between the edges unclamped, flowing a fluidizable, pulverulent material from a source through a conduit communicating with the unclamped portion of the membrane which interfaces with the rim, thereby introducing the pulverulent material between the outer surface of the rim and the membrane and expanding the membrane against a surface of a first mold surrounding the outer surface of the rim and membrane, creating a vacuum in the space defined between the outer surface of the rim and the membrane after the space has been filled with the pulverulent material to form a rigid core around the rim for use in molding the article of manufacture in a second mold and destroying the core by creating a pressure differential which causes the flow of the pulverulent material through the conduit to return it to its source for reuse in the manufacture of another article of manufacture.

14. A method of molding an article using a rigid core constructed on an outer peripheral surface of an annular support comprising creating around the outer surface of the annular support during each molding cycle a cavity of predetermined volume by applying a new non-reusable film around the outer surface of the annular support and against a molding surface surrounding the outer surface of the annular support, fixing axially opposite edges of the film around the outer surface of the support to close the cavity, filling the cavity formed between the film and the outer surface of the support with a plurality of solid particles supplied from within the annular support through a passage, evacuating air from the cavity to produce a rigid core, removing the mold surface formed around the annular support while retaining the rigid core on the support and molding the article on the rigid core and the annular support.

15. A method of manufacturing a pneumatic tire of vulcanizable rubber comprising:

constructing a rigid core around the outer surface of an annular support during each manufacturing cycle by applying a membrane against a first molding surface surrounding the outer surface of the annular support, fixing the membrane to the outer surface of the annular support to form a closed space between the membrane and the outer surface of the support, filling the closed space with a fluidizable solid material, making the material rigid to produce the rigid core and removing the first mold;

assembling a raw blank on the rigid core;

molding the raw blank by closing around the core supporting the blank a second mold having a molding surface, the second mold comprising other rigid parts which cooperate with the core, in order to define the final geometry of the tire and to define a molding volume which corresponds substantially to the volume of the raw blank so as to imprison the blank and the mold surface for molding the tire;

then vulcanizing the tire with regulated pressure by, after molding the blank, again making said fluidizable material fluid and subjecting said closed space to the action of said regulated pressure, then removing the second mold and releasing the tire with the membrane.

* * * * *

UNITED STATES PATENT AND TRADEMARK OFFICE
CERTIFICATE OF CORRECTION

PATENT NO. : 6,224,808 B1
DATED : May 1, 2001
INVENTOR(S) : Essinger et al.

It is certified that error appears in the above-identified patent and that said Letters Patent is hereby corrected as shown below:

<u>Column 12,</u>
Line 1, "membrane" should read -- stretchable membrane --
Line 25, "film" should read -- stretchable film --

Signed and Sealed this

Ninth Day of April, 2002

Attest:

Attesting Officer

JAMES E. ROGAN
*Director of the United States Patent and Trademark Office*